US012486645B2

(12) United States Patent
González et al.

(10) Patent No.: US 12,486,645 B2
(45) Date of Patent: Dec. 2, 2025

(54) VISIBILITY OF WORK IMPLEMENT USING AUGMENTED REALITY (71) Applicant: Deere & Company, Moline, IL (US)

(72) Inventors: Juan Daniel González, Saltillo (MX); Ignacio Alonso Martinez, Ramos Arizpe (MX); Daniel Chapa Montemayor, Monterrey (MX)

(73) Assignee: Deere & Company, Moline, IL (US)

( * ) Notice: Subject to any disclaimer, the term of this patent is extended or adjusted under 35 U.S.C. 154(b) by 350 days.

(21) Appl. No.: 17/976,008

(22) Filed: Oct. 28, 2022

(65) Prior Publication Data
US 2024/0141619 A1 May 2, 2024

(51) Int. Cl.
E02F 9/26 (2006.01)
B60K 35/00 (2024.01)
(Continued)

(52) U.S. Cl.
CPC ............... *E02F 9/26* (2013.01); *B60K 35/00* (2013.01); *B60K 35/10* (2024.01); *B60K 35/23* (2024.01);
(Continued)

(58) Field of Classification Search
CPC . E02F 9/26; E02F 9/264; B60K 35/00; B60K 35/10; B60K 35/23; B60K 35/02;
(Continued)

(56) References Cited

U.S. PATENT DOCUMENTS 8,918,246 B2 * 12/2014 Friend ..................... G06T 11/00
701/50
2010/0277468 A1 * 11/2010 Lefevre ............... H04N 21/816
715/849
(Continued)

FOREIGN PATENT DOCUMENTS

EP 3385458 A1 10/2018
EP 3951103 A1 2/2022
(Continued)

OTHER PUBLICATIONS

Extended European Search Report and Written Opinion issued in European Patent Application No. 23204575.7, dated Feb. 29, 2024, in 08 pages.

*Primary Examiner* — Rodney A Butler
(74) *Attorney, Agent, or Firm* — Tucker Ellis LLP; Michael G. Craig (57) ABSTRACT One or more techniques and/or systems are disclosed for improvements to a work vehicle that utilizes an implement that may be partially obscured from operator view during use. A camera array can be mounted to the vehicle to generate image data for the working environment of the implement and target object of the implement. Further, a gaze direction and position for the vehicle operator can be detected using a second camera array. The implement image data and operator image data can be combined to generate an augmented image for display in the line of sight of the operator. The augmented image comprises computer generated representations of the implement where it is obscured (Continued)

from view, along with the target object. In this way, the operator can effectively interact with the target object, even though the implement and object may be out of direct sight of the operator.

19 Claims, 5 Drawing Sheets

(51) Int. Cl.
  *B60K 35/10* (2024.01)
  *B60K 35/23* (2024.01)
  *B60K 35/28* (2024.01)

(52) U.S. Cl.
  CPC ........ *B60K 35/28* (2024.01); *B60K 2360/149* (2024.01); *B60K 2360/176* (2024.01); *B60K 2360/177* (2024.01)

(58) Field of Classification Search
  CPC ........ B60K 2360/149; B60K 2360/176; B60K 2360/177; B60K 35/28; G02B 2027/0138; G02B 2027/0141; G02B 27/0101; G02B 2027/0187; G02B 27/0093
  USPC .......................................................... 701/50
  See application file for complete search history.

(56) References Cited

U.S. PATENT DOCUMENTS

| | | | |
|---|---|---|---|
| 2010/0289899 A1 | 11/2010 | Hendron et al. | |
| 2014/0188333 A1* | 7/2014 | Friend ..................... | E02F 9/261 |
| | | | 701/34.4 |
| 2015/0175068 A1* | 6/2015 | Szostak .................. | G02B 27/01 |
| | | | 340/435 |
| 2016/0224852 A1* | 8/2016 | Vicente .................... | B60Q 9/00 |
| 2018/0144523 A1* | 5/2018 | Edelman ............ | G02B 27/0093 |
| 2018/0171594 A1* | 6/2018 | Tsuji ........................ | E02F 9/26 |
| 2019/0004325 A1* | 1/2019 | Connor .............. | G02B 27/0172 |
| 2019/0291579 A1* | 9/2019 | Fujita .................... | B60K 35/00 |
| 2021/0174767 A1* | 6/2021 | Edgren ................. | G06V 40/18 |
| 2021/0206330 A1 | 7/2021 | Lee et al. | |
| 2021/0223400 A1 | 7/2021 | Park et al. | |
| 2021/0285184 A1* | 9/2021 | Tanimoto ................ | E02F 9/262 |
| 2022/0178114 A1* | 6/2022 | Takahama .............. | G01C 15/00 |
| 2022/0281316 A1* | 9/2022 | Pfaff .................. | B62D 49/0614 |
| 2023/0001854 A1* | 1/2023 | Bruflodt ................... | B60R 1/23 |

FOREIGN PATENT DOCUMENTS

| | | | |
|---|---|---|---|
| JP | 6258582 B2 | 1/2018 | |
| JP | 2022072598 A | * 5/2022 | |

* cited by examiner

VISIBILITY OF WORK IMPLEMENT USING AUGMENTED REALITY

BACKGROUND

Work vehicles, such as loaders, motor graders, tractors, bulldozers, feller bunchers, crawlers, excavators, and skid steers, often include work tools or implements that are configured to perform material handling functions to interact with target objects. For example, a front end loader, hay bale grabber, tree cutter, etc. can have a portion of the implement that is obscured from view of the operator during use. That is, a portion of the vehicle, such as the engine compartment, can obscure a portion of the implements operating environment, and the target object, during use. Such obstructions may include, for example, a boom structure configured to operate the work tool, the work tool itself, a hood of the utility vehicle, a door of the utility vehicle, a part of the chassis, etc. This obstruction can complicate effective material handling.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for improving manipulation of a vehicle mounted implement, such as where the implement may be at least partially obscured from view at the vehicle operator position. In some implementations, such as system can comprise a camera array (or the like) mounted on the vehicle to collect real-time images of the portions of the implement that may be obstructed from the operator's view. Further, a direction of gaze of the operator can be detected, and the implement image data and gaze data can be combined. The system can provide a computer generated, augmented view of the implement and implement's working environment, in a perspective view from the operator's position. In this way, the augmented view can provide a more clear, line-of-sight view of the working implement, from the operator's perspective, when the implement may be obscured from the view of the operator.

In one implementation a system for improving manipulation of a vehicle mounted implement, can be operably mounted on a work vehicle that comprises a work implement that is operably manipulated by a vehicle operator in a vehicle operator position. In this implementation, the system can comprise an imaging instrument that is mounted on the vehicle and provides image data indicative of a real-time view of the work implement when at least a portion of an operating position of the implement is obstructed from view at the vehicle operator position. Further, an operator detector can operably detect a direction of gaze for the operator to generate gaze position data. Additionally, an image processor can operably receive the image data from the camera and the gaze position data from the operator detector, and generate augmented image data. In this implementation, an image projector can operably receive the augmented image data from the image processor and display an augmented image on a screen that is in the line of sight between the vehicle operator position and an operating position of the implement. The augmented image can comprise a real-time view of the implement in the implement's operating environment based at least on the image data, and can comprise a relevant operator perspective view based at least on the gaze position data.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A system can be devised for improving manipulation of a vehicle mounted implement, such as where the implement may be at least partially obscured from view at the vehicle operator position. That is, for example, view of the implement may be obscured from the operator's view by portions of the vehicle itself, such as the front portion or rear elements of the vehicle. In this example, without a clear view, accurate manipulation of the implement can be hindered. In some implementations, such as system can be operably mounted on a vehicle that utilizes work implements that are operably manipulated by a vehicle operator from a vehicle operator position. The system can provide a computer generated image, showing an augmented view of the implement and implement's working environment, from the operator's perspective view, such that the augmented view provides a clear, line-of-sight view of the working implement, even when the implement is obscured from actual view for the operator.

Figure 1A:
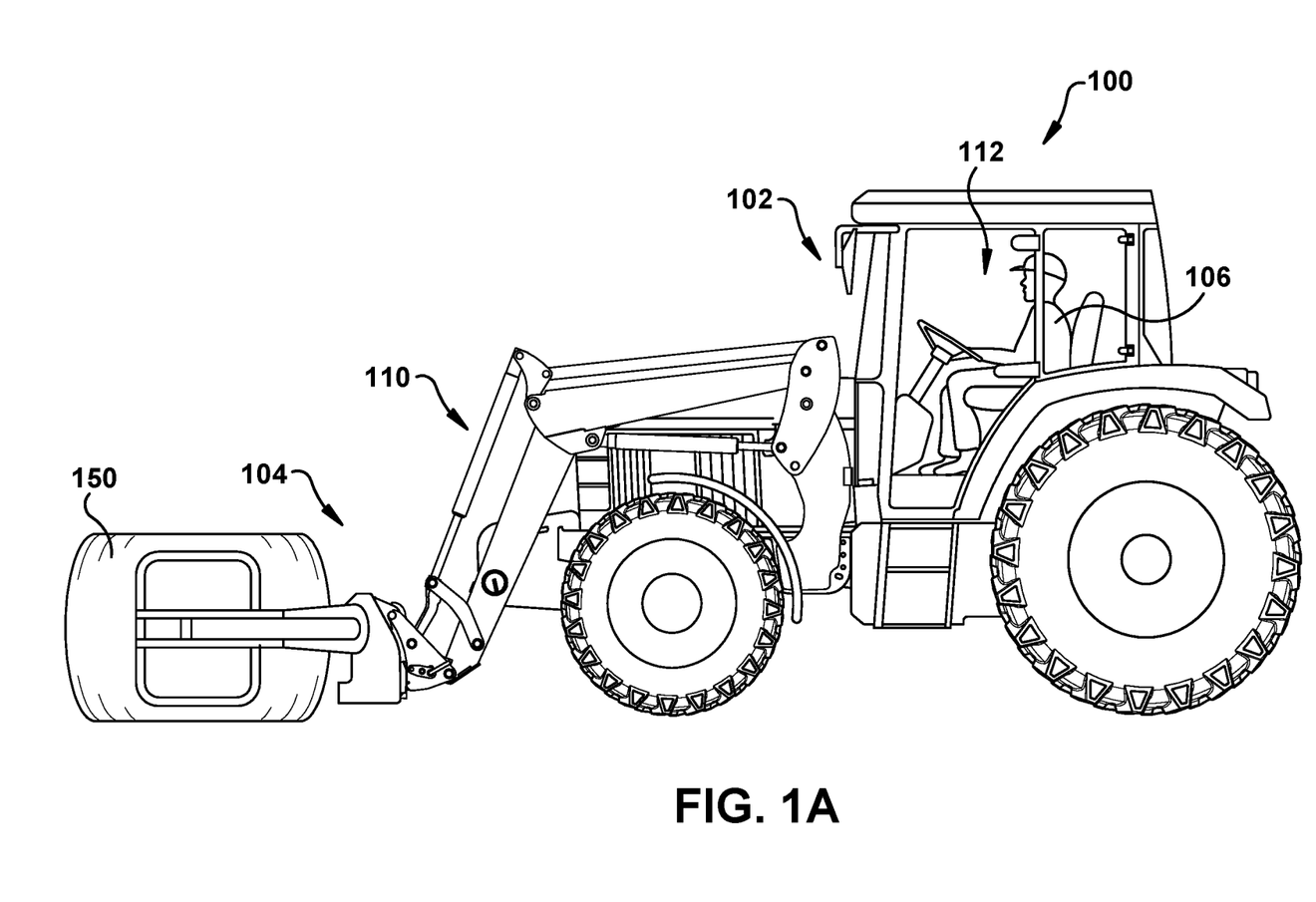
FIGS. 1A and 1B are component diagrams illustrating one embodiment of an example environment where one or more portions of the systems disclosed herein can be implemented.
Figure 1B:
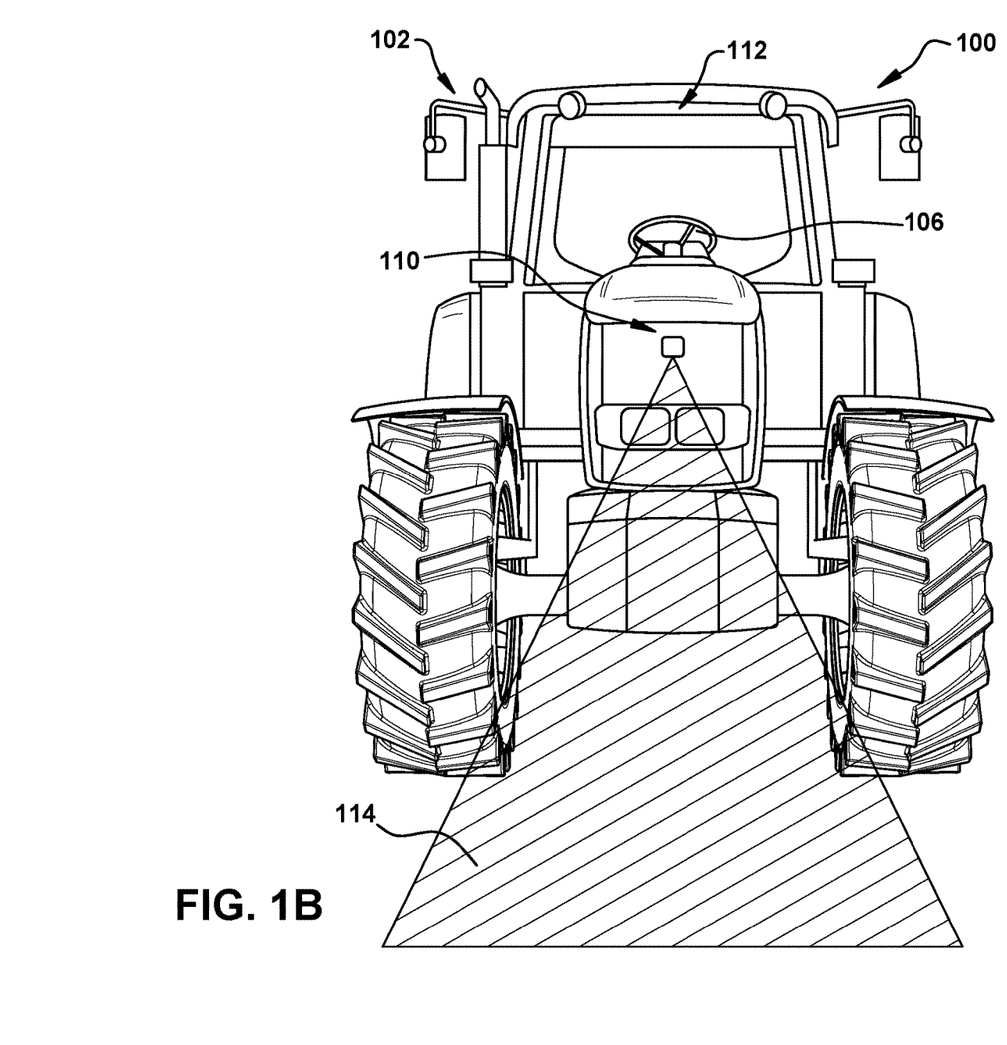

FIGS. 1A and 1B are component diagrams illustrating an example implementation where one or more portions of the innovative concepts described herein may be utilized. In this implementation, as illustrated in FIGS. 1A and 1B, a vehicle 102, such as a tractor, can be coupled with a working implement 104, such as a bale picker. In this implementation, for example, the implement 104 can be engaged at the front of the vehicle 102 during a working operation. In some implementation, as illustrated, the vehicle 102 may have wheels installed. In other implementations the vehicle 102 may have track systems installed on the rear or both the front and rear instead of wheels.

As one example, the vehicle 102, can be attached to the implement 104 to perform target work operations. In this example, the tractor can use the implement 104 to interact with target objects 150, such as picking up, moving and depositing bales, which may involve manipulation of the bale picker 104 to appropriately engage with the target object 150 in a field. In this example, as the bale picker implement 104 is lowered to engage the bale 150, a view of the picker implement 104 may be obstructed from the view at the operator position 106. This can result in an operator not being able to view the picking operation, possibly needing to guess where and when to grab the bale, in this example. As described further herein, an example system 100 for improving manipulation of a work implement 104 can comprise one or more external imaging devices 110, and interior processing and display devices 112, which allow the operator to view and augmented image of the implement 104 and the target object 150, despite the obstructed view. As an example, the one or more external imaging devices 110 may detect (e.g., image) one or more portions of the example implement 104, and any target object 150, such as bales, within a field of view 114 of the external imaging devices 110.

While this example describes a tractor coupling with a bale picker implement at the front of the vehicle, it should be appreciated that the systems and methods described herein may also be utilized with other types of vehicles and implements. For example, the vehicle may comprise another utility-type vehicle, such as a truck, hauler, semi-tractor, or any vehicle that couples with an implement either at the front, rear, or sides of the vehicle, to interact with objects that may be partially obscured from view of the operator. Further, for example, the implement may comprise a bucket, scrapper, digger, post hole implement, grasping tool, or any such implement that is manipulated from the operator position to interact with objects outside of the operator position.

Figure 2:
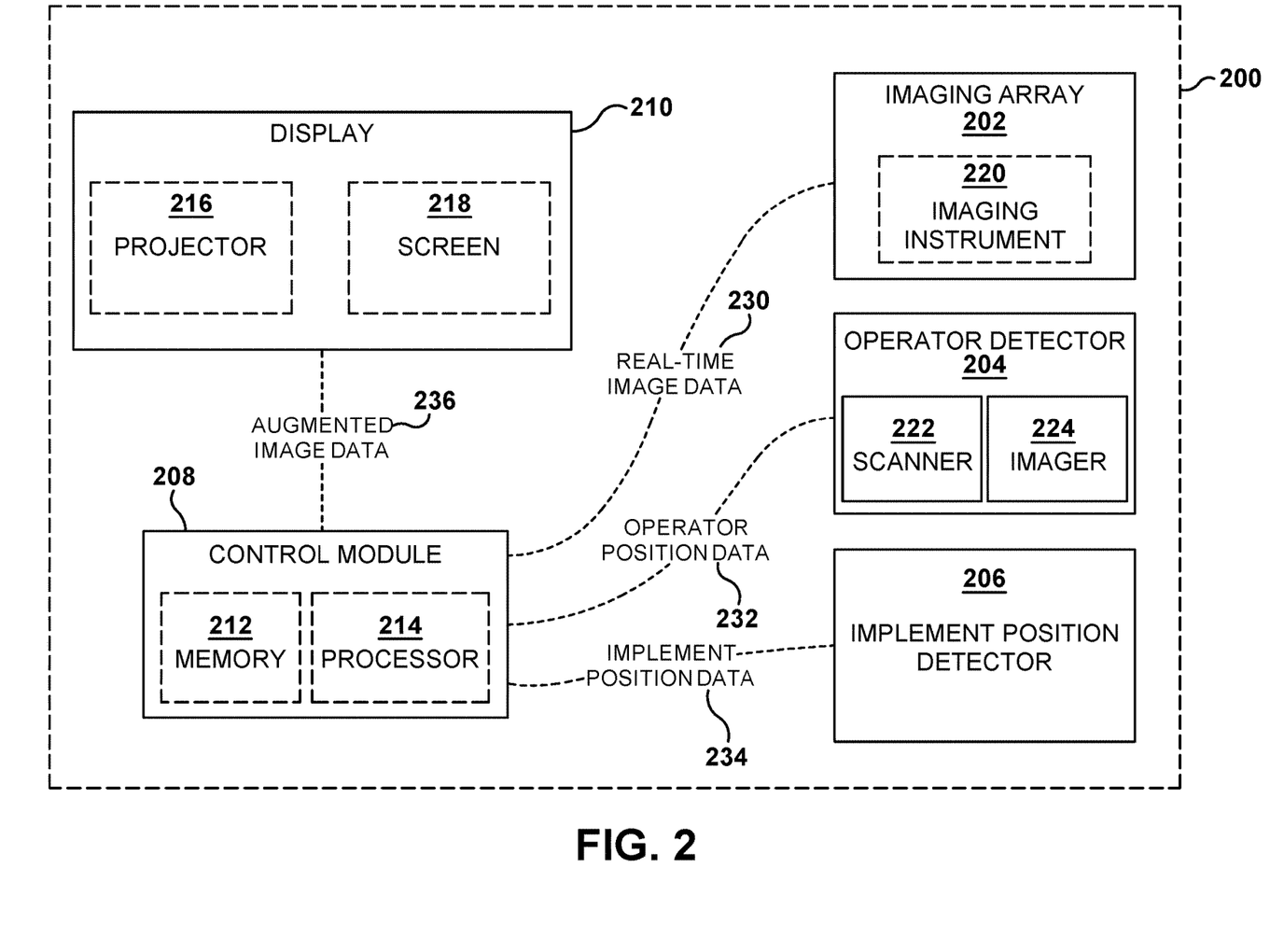
FIG. 2 is a schematic diagram illustrating one implementation of one or more portion of one or more systems described herein.

FIG. 2 is a schematic diagram illustrating one example implementation of a system 200 for improving manipulation of a vehicle mounted implement (e.g., system 100 of FIG. 1), as described further herein. In this implementation, the example system 200 can comprise an imaging instrument 220 (a.k.a. camera array or imaging array) in an imaging array that comprises the at least one imaging instrument 220, such as a camera (e.g., digital camera) or the like. As an example, the imaging instrument 220 is one that is capable of detecting objects in its area of detection or vision, which can include cameras (e.g., fish-eye lens cameras) that operate in different light spectra (e.g., visible and non-visible), as well as LIDAR, ultrasonic imaging, and others known in the art; and also generate data that is indicative of the image of the detected object(s). As an illustrative example, one or more imaging instruments 220 can form the imaging array 202; and the one or more imaging instruments 220 can be mounted on and around a vehicle (e.g., 102 of FIG. 1) for which the system 200 is configured. In this example, the placement of the imaging instrument(s) 220 and disposition of respective imaging areas of the one or more imaging instruments 220 is configured to detect the implement (e.g., 104 of FIG. 1) in its operating environment, along with a target object (e.g., 150 of FIG. 1) with which the implement is intended to interact. Further, in this implementation, respective one or more imaging instruments 220 that are mounted on the vehicle are configured to provide image data 230 that is indicative of a real-time view of the work implement when at least a portion of an operating position of the implement is obstructed from view at the vehicle operator position (e.g., 106 of FIG. 1)

In FIG. 2, the example system 200 further comprises an operator detector 204 that operably detects the presence of, location of, position of, and or a direction of gaze for an operator disposed in the vehicle operator position. The operator detector 204 can be configured to generate operator position data 232 that is indicative of the presence, position, location, and or direction of gaze of the operator (e.g., gaze position data indicative of a direction of the operator's eyes or line or sight). In some implementations, the operator detector 204 can comprise an eye scanner 222 that is configured to detect the direction of gaze of one or both of the eyes (e.g., operator line of sight) of the operator in real-time.

In other implementations, the operator detector 204 can comprise an imaging device 224 and/or sensor, such as a digital camera, ultrasonic sensor, a LIDAR device, or a beacon (e.g., generating a detectable signal) disposed on the operator. As an example, the one or more components of the operator detector 204 can be configured to detect the operator's gaze position, the head position, to detect the presence of the operator, detect the position or location of the operator, and detect the orientation of the operator. In this way, for example, the operator position data 232 can be used, in conjunction with the real-time image data 230, to generate an augmented image that can provide a perspective view that changes in real-time to substantially match the vehicle operator's position (e.g., eye/head position).

In some implementations, the detection of the operator in the operator position can further comprise identity matching of the operator. That is, for example, one or more features (e.g., biometrics) of the operator can be detected (e.g., imaged) and compared to stored data indicative of the features. In this way, in this example, the identity of the operator can be detected, and one or more operational controls, adjustments, etc. can be made to accommodate the identified operator. Additionally, operator identification may be used to provide for activation of the vehicle, or not, based on pre-determined security protocols.

In some implementations, the example system 200 can comprise an implement position detector 206 that is configured to detect the location and/or operational position of the implement (e.g., and parts thereof). That is, for example, an implement such as the bale picker 104 of FIG. 1, can comprise at least two holders that are disposed on the end of an articulating arm. In this example, the implement position detector 206 can generate implement position data 334 that is indicative of the position and disposition (e.g., articulation) of the arm, and the position and disposition (e.g., open closed, partial) of the holders. Similar data can be generated for a variety of implements that may be coupled with the vehicle. In this implementation, the implement position data 334 can be used to generate augmented images that indicate the position and orientation or disposition of the implement in an augmented image. As an example, position sensors (e.g., beacons, accelerometers, etc.) can be disposed on one or more locations of the implement to identify a position and/or location of the implement (e.g., and parts thereof).

Figure 3:
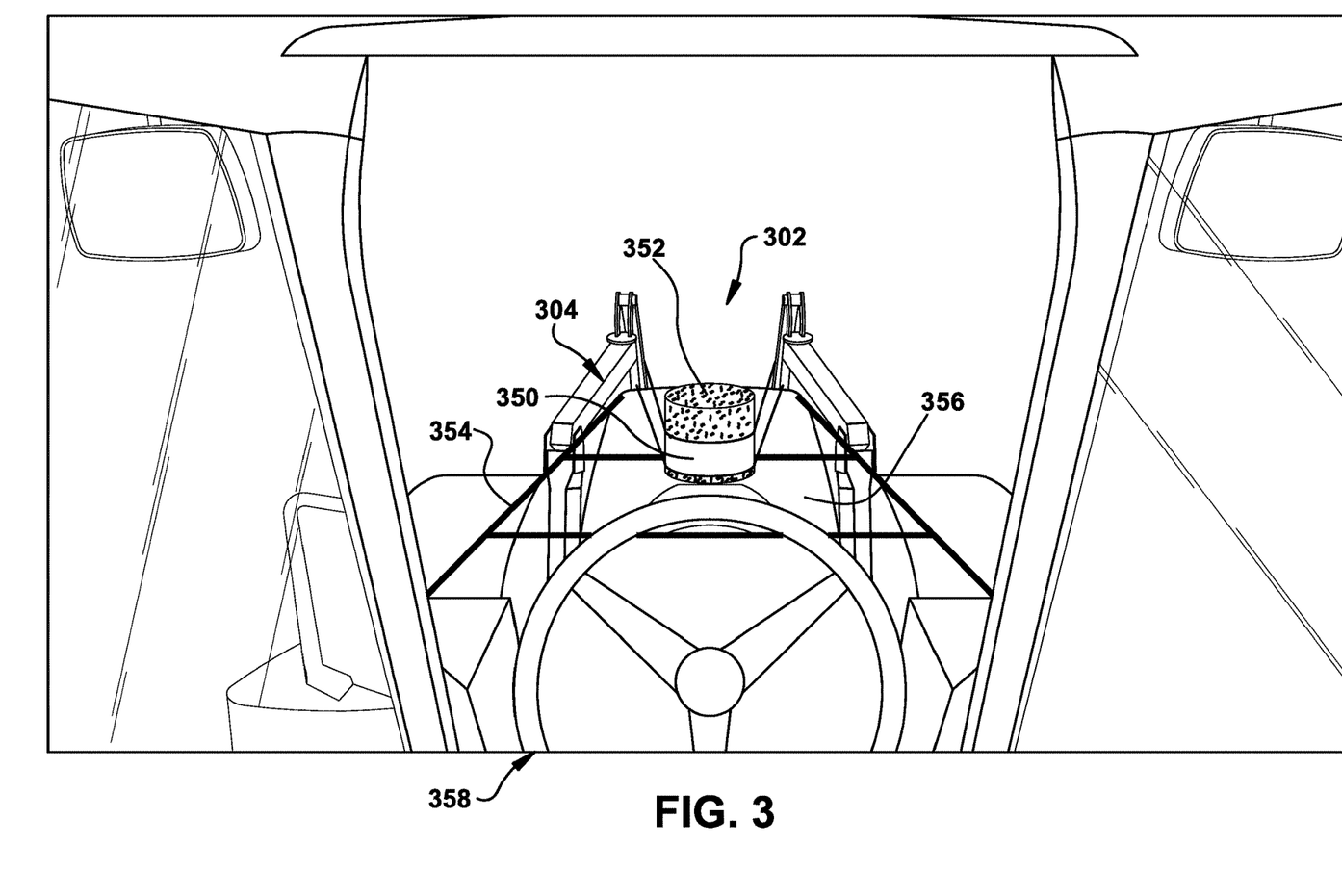
FIG. 3 is a component diagram illustrating one implementation of one or more portion of one or more systems described herein.

As illustrated in FIG. 2, the example system 200 can comprise an image processor 208, such as a control module, that operably receives the image data 230 from the imaging array 202 (e.g., camera), and the operator position data 232 (e.g., gaze position data) from the operator detector 204. In this implementation, the image processor 208 can be configured to generate augmented image data, for example, which can comprise images or portions of the actual operating environment of the implement, computer generated images of portions of the implement, transparent portions, and combinations thereof. As an illustrative example, as shown in FIG. 3, an augmented image 302 can comprise computer generated images 304 that show portions of the target working implement 350 (e.g., in this case the bale handler), portions of the target object 352 (e.g., bale), and/or guides, guide lines 354. In this way, for example, real-time augmented images of the target implement 350 and target object 352 that are obscured by portions of the tractor 356 can be observed by the operator from the operator position 358. Further, for example, the computer generated guides 354 can be disposed between the implement 350 and the vehicle operator position 358 to help visually guide the operator to interact with the target object 352.

In some implementations, the image processor 208 can comprise memory 212 that is configured to store computer code and other data that is used by a computer processor 214 to run one or more programs configured to process image data into augmented image data 236. That is, for example, a program can be stored in memory 212, and processed by the processor 214. The memory 212 can store the received image data, etc., and the processor can covert the real-time image data 230, operator position data 232, and/or implement position data 234 into the augmented image data 236. The augmented image data 236 can be stored locally in the memory 212, and/or sent to the display 210.

With continued reference to FIG. 3, as illustrated in FIG. 2, the example system 200 comprises an image display 210 that operably receives the augmented image data 236 from the image processor 208. The display 210 displays an augmented image 302 on a screen 360 in line of sight between the vehicle operator position (e.g., 106) and an operating position of the implement 350. The augmented image 302 comprises a real-time view of the implement 350 in the implement's operating environment based at least on the image data 230. The augmented image 302 also comprises a relevant operator perspective view based at least on the gaze position data 232, from the operator position 358. In this way, for example, the operator can view the position and disposition of the implement 350 with respect to the target object 352, from the operator's position 358. This may allow the operator to interact with the target object 352 appropriately without actually having a line-of-sight view of the object 352. In some implementations, the augmented image can comprise a one to one (1:1) ratio scaled image of the implement 350 and environment. In other implementations, the image can be scaled such that the objects (e.g., implement 350 and/or target object 352) are larger or smaller than actual size.

Further, the augmented image 302 provides perspective view from the operator position 358, which provides an improved, real-time view of the implement 350 and target object 352, instead of merely a static perspective. That is, as the position of the operator's head, and/or the direction of the operator's gaze changes the perspective view of the implement operating environment also changes to account for the operator's view/line of sight. This provides a more accurate view for interacting with the target object 352.

Figure 4:
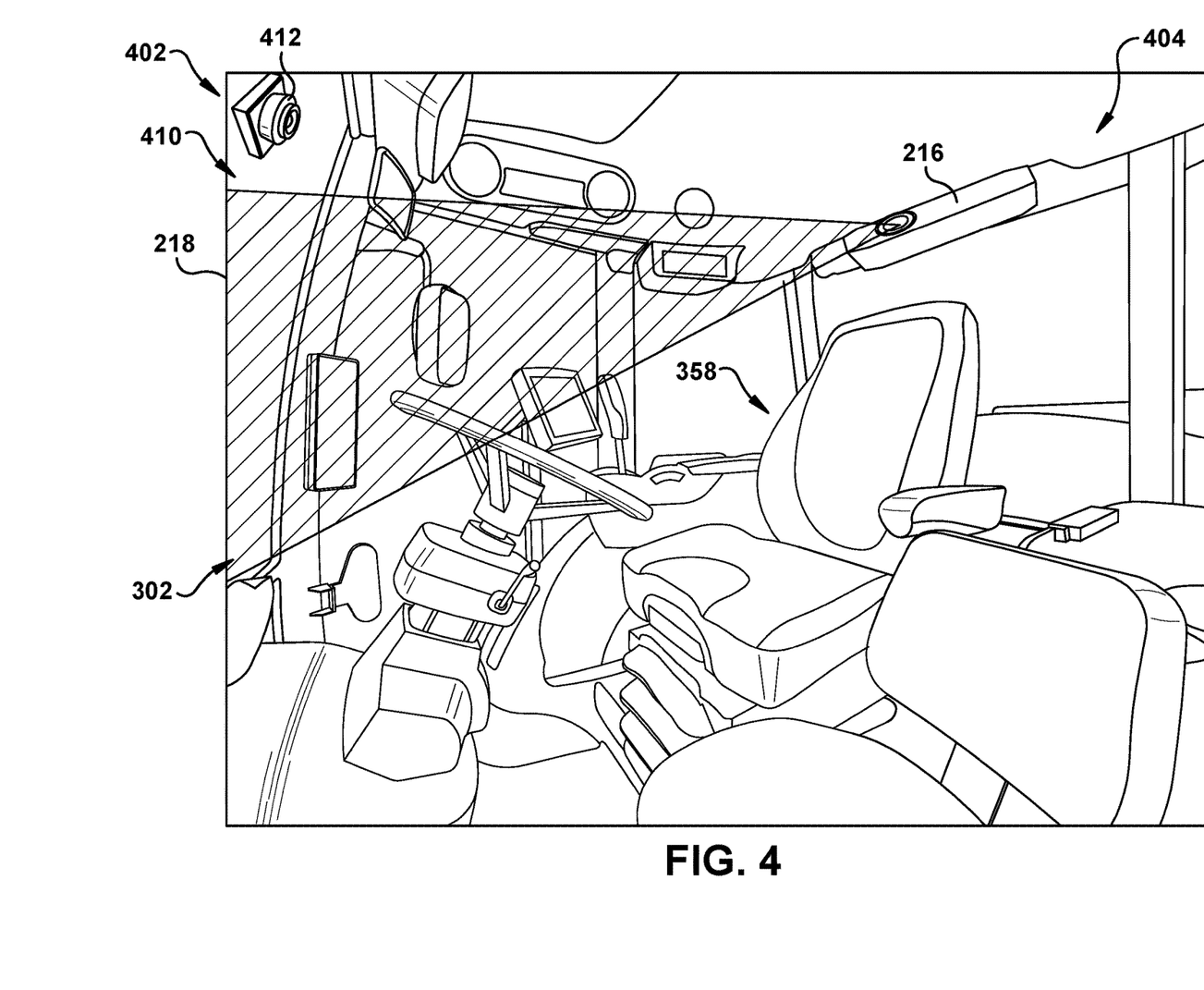
FIG. 4 is a component diagram illustrating one implementation of one or more portion of one or more systems described herein.

In some implementations, as illustrated in FIG. 4, with continued reference to FIG. 2 and, the display 210 can comprise a projector 216 and a screen 218. In this example, the projector 216 can be positioned to project the augmented image 302 onto the screen 218, which is disposed in the line-of-sight between the operator position 358 and the implement 350. In some implementations, the vehicle 402 can comprise a cab 404 (e.g., enclosed operator area), and the image projector 216 can be disposed in the cab 404 above the vehicle operator position 358. In other implementations, the display 210 can comprise an operator wearable device, such as glasses or a heads up display (HUD), which comprising the screen 218 that operably displays the augmented image 302. In some implementations, the vehicle 402 comprises a windshield 410 and the screen 218 is positioned on the windshield 410. As one example, the screen 218 can comprise a transparent film that is disposed on the windshield 410, and is configured to display the augmented image 302 while being optically transparent from the operator position 358. In some implementations, the display 210 can comprise a three-dimensional (3D) image projector (e.g., 216) that operably displays the augmented image 302 as a 3D image. In this implementation, the system can also comprise wearable 3D glasses that are operably worn by the operator to appropriately view the 3D image.

As illustrated in FIGS. 2 and 4, the operator detector 204 can comprise a scanner 222 and/or an imager 224. That is, for example, a scanner 22 can comprise a device that detects the presence of the operator in the operator position 358, such as an ultrasonic sensor or a beacon device disposed on the operator. The scanner 22 can detect the presence of the operator, and may be used to detect the position of the operator and/or the operator's gaze. Is some implementations, the imager 224 can comprise a camera 412 that is directed toward the operator position 358 to detect the presence, position, and direction of gaze of the operator. In some implementations, the imager 224 can comprise a LIDAR system that images the operator position 358 to detect the presence, positon, and direction of gaze of the operator, including eye positions and head position. In some implementations, the scanner 222 and/or imager 224 can detect the presence of the operator at the operator position 358, and may also identify the operator to match the detected operator to data indicative of a known operator stored in memory (e.g., 212). In this way, the operator position (e.g., controls, seat, etc.) can be adjusted to accommodate the known operator, and/or the vehicle may not be enabled to start at least until a known operator is identified.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for improving manipulation of a vehicle mounted implement, the system operably mounted on a work vehicle comprising a work implement that is operably manipulated by a vehicle operator in a vehicle operator position, the system comprising:
    an imaging instrument mounted on the vehicle and providing image data indicative of a real-time view of the work implement when at least a portion of an operating position of the implement is obstructed from view at the vehicle operator position;
    an operator detector that operably detects a direction of gaze for the operator to generate gaze position data;
    an image processor operably receiving the image data from the imaging instrument and the gaze position data from the operator detector, and generating augmented image data; and
    a display operably receiving the augmented image data from the image processor and displaying an augmented image on a screen in line of sight between the vehicle operator position and an operating position of the implement, the augmented image comprising a real-time view of the implement in the implement's operating environment based at least on the image data, and the augmented image comprising a relevant operator perspective view based at least on the gaze position data, wherein the perspective view indicates relative depth and angle of view of the implement in the implement's operating environment from the operator's perspective, the augmented image further comprising a computer generated image of at least a portion of the implement in a computer augmented perspective view from the vehicle operator's position.

2. The system of claim 1, the augmented image comprising one or more computer generated guides disposed between the implement and the vehicle operator position.

3. The system of claim 1, the vehicle comprising a cab, and the display comprising an image projector that operably projects an image, the image projector disposed in the cab above the vehicle operator position.

4. The system of claim 1, the display comprising an operator wearable device comprising the screen that operably displays the augmented image.

5. The system of claim 1, the vehicle comprising a windshield and the screen positioned on the windshield.

6. The system of claim 5, the screen comprising a film disposed on the windshield, the film configured to display the augmented image and to be optically transparent from the vehicle operator position.

7. The system of claim 1, the display comprising a three-dimensional (3D) image projector that operably displays the augmented image as a 3D image, and the system comprising wearable 3D glasses operably worn by the operator to appropriately view the 3D image.

8. The system of claim 1, the imaging instrument comprising a camera array operably imaging the implement and the implement's operating environment.

9. The system of claim 1, the imaging instrument comprising a LIDAR array operably imaging the implement and the implement's operating environment.

10. The system of claim 1, the augmented image comprising a one to one scaled image of the real-time view of the implement and the implement's operating environment from a perspective of the vehicle operator in the detected direction of gaze.

11. The system of claim 1, the image processor comprising a computer processor and computer memory comprising programmatic instructions configured for use by the processor to process the image data and gaze position data into the augmented image data.

12. The system of claim 1, the operator detector comprising an eye scanner that detects the direction of gaze of one or both of the eyes in real-time, resulting in the perspective view of the augmented image changing in real-time to substantially match the vehicle operator's eye position.

13. The system of claim 1, the operator detector comprising one or more of:
    a digital camera;
    an ultrasonic sensor;
    a beacon disposed on the operator; and
    a LIDAR device.

14. The system of claim 1, the operator detector detecting the direction of gaze by detecting one or more of a position of the operator's head, and a position of the operator's eyes.

15. The system of claim 1, the operator detector operably detecting a presence of the operator in the operator position, and matching the operator to a known operator in order to activate the vehicle.

16. The system of claim 1, the operator detector operably detecting a presence of the operator in the operator position, and matching the operator to a known operator to automatically adjust the operator position to fit the known operator.

17. A system for improving manipulation of a vehicle mounted implement, the system operably mounted on a work vehicle comprising a work implement that is operably manipulated by a vehicle operator in a vehicle operator position, the system comprising:
- a camera array mounted on the vehicle and providing implement image data indicative of a real-time view of at least a portion of the work implement in an implement operating position, wherein the at least a portion of the work implement is obstructed from view from the vehicle operator position;
- an operator sensor that detects a direction of gaze of the operator at the vehicle operator position, the operator sensor generating gaze position data;
- an image processor generating augmented image data based at least upon the implement image data and the gaze position data; and
- an image display disposed in line of sight between the vehicle operator position and the implement operating position, the image display operably displays an augmented image based at least upon the augmented image data, the augmented image comprising a real-time view of the at least a portion of the work implement in the implement operating position based at least upon the implement image data, and the augmented image comprising a relevant operator perspective view based at least on the gaze position data, wherein the perspective view indicates relative depth and angle of view of the implement in the implement's operating environment from the operator's perspective, the augmented image further comprising one or more computer generated guides disposed between the implement and the vehicle operator position.

18. The system of claim 17, the camera array and/or the operator sensor comprising one or more of:
- a digital camera;
- an ultrasonic sensor;
- a beacon disposed on the operator and/or the work implement; and
- a LIDAR device.

19. A work vehicle comprising:
- a work implement that is operably manipulated by a vehicle operator in a vehicle operator position;
- a camera array mounted on the vehicle, the camera array comprising a digital camera that operably provides generates image data indicative of a real-time view of at least a portion of the work implement in an implement operating position, wherein the at least a portion of the work implement is obstructed from view from the vehicle operator position;
- an operator sensor comprising at least a camera that operably detects the presence of the operator and a direction of gaze of the operator from the vehicle operator position based on a head position and/or an eye position of the operator, the operator sensor generating operator detection data comprising operator gaze position data;
- an image processor comprising a computer processor and computer memory comprising programmatic instructions configured for use by the processor to process the implement image data and the operator gaze position data to generate augmented image data; and
- an image display comprising a screen that is disposed in line of sight between the vehicle operator position and the implement operating position, the image display operably displaying an augmented image based at least upon the augmented image data, the augmented image comprising a rendering of a real-time view of the at least a portion of the work implement in the implement operating position and a relevant operator perspective view based the direction of gaze of the operator from the vehicle operator position, wherein the perspective view indicates relative depth and angle of view of the implement in the implement's operating environment from the operator's perspective, the augmented image further comprising a computer generated image of at least a portion of the implement in a computer augmented perspective view from the vehicle operator's position, and comprising one or more computer generated guides disposed between the implement and the vehicle operator position.

* * * * *